Dec. 20, 1932.  E. M. T. RYDER  1,891,336
WHEEL
Filed July 8, 1931

INVENTOR
E. M. T. Ryder
BY
Gifford, Scull & Burgess
ATTORNEYS.

Patented Dec. 20, 1932

1,891,336

UNITED STATES PATENT OFFICE

ELY M. T. RYDER, OF YONKERS, NEW YORK

WHEEL

Application filed July 8, 1931. Serial No. 549,372.

This invention relates to a novel and improved form of wheel, particularly one adapted for use with pneumatic tires. The novel features of the invention will be best understood from the following description and annexed drawing, in which I have shown a selected embodiment of the invention, and in which.

Figure 1:
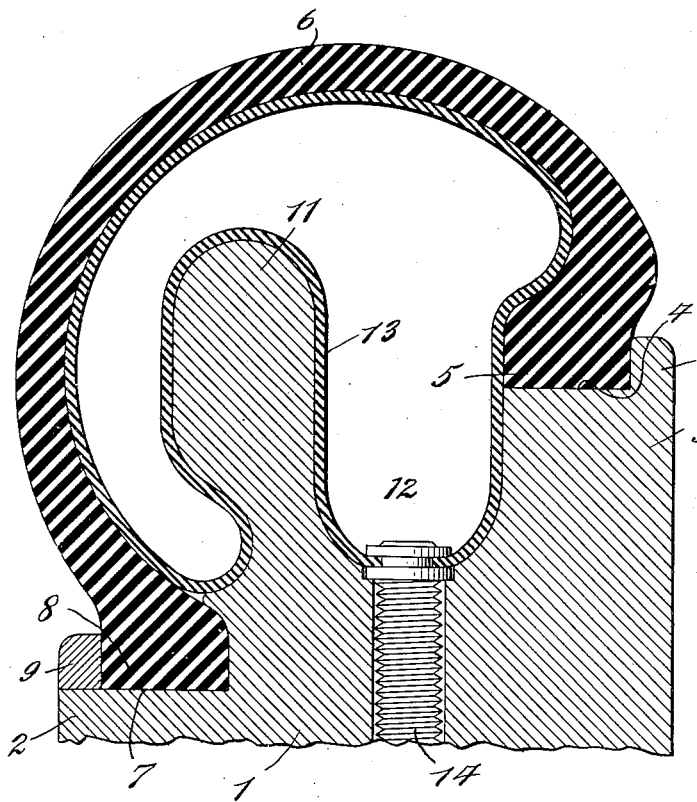
Fig. 1 is a fragmentary section through a wheel rim and the tire mounted thereon.

The use of pneumatic tires, particularly as at present employed, materially increases the diameter of the wheels on which they are placed, which means that if for any reason a tire becomes deflated, the effective diameter of the wheel is materially reduced and if the deflation takes place suddenly, as by a blowout, the vehicle on which the wheel is mounted is placed in a dangerous condition, especially if operating at high speed. This danger is increased by the fact that the present tendency is to use tires of greater size than hitherto and, of course, when a vehicle is a heavy one, the tire is also one which very greatly increases the diameter of the wheel upon which it is mounted.

According to my invention, I materially reduce the danger which flows from a deflation of the tire by having one side of the rim of larger diameter than the other or by mounting within the space surrounded by the tire a rigid member projecting outwardly from the rim into the space surrounded by the tire or by both methods so that upon sudden deflation, or deflation from a slow leak, for instance, the wheel will run upon this larger diameter side of the rim or upon this projection, the outer portion of the projection determining the effective diameter of the wheel. It will also be seen that the injury to the tire itself due to running deflated will be materially decreased.

A small tire with heavy air pressure will give less change in diameter of wheel upon deflation than a large low pressure tire but the small tire is objectionable in riding and service qualities. With my invention, the advantage of a large tire is secured with a minimum of reduction in wheel diameter in case of deflation.

Referring now to the drawing, I have shown a wheel having a rim 1 with opposite sides 2 and 3 thereof of different diameters, in this instance, the side 3 having the greater diameter. On the side 3 is provided a seat 4 upon which rests one edge portion or bead 5 of a tire having a tread portion 6. The side 2 of the rim is likewise provided with a seat 7 upon which rests the other edge or bead portion 8 of the tire. It will be seen that the tire is made of special form so that one edge or bead is of greater diameter than the other, the bead of greater diameter being located adjacent the tread portion of the tire with substantially no side wall between it and the tread portion, whereas on the other side of the tire there is a side wall between the bead 8 and the tread portion 6 similar to the usual side wall. The difference in diameter of the two sides of the rim is thus of a substantial amount, so that in effect a large part of the tire is eliminated and the rim on one side is brought up close to the tread of the tire so that, in case of collapse of the tire, this side of the rim may engage the ground without a radical difference in diameter between the tread and the rim. The edge portion 8 may be held in place on its seat by means of a removable ring 9 which may be detachably secured in place by lugs or bolts in the usual manner. The bead portion 5 may be conveniently held in place by a stationary ring 10 integral with the rim. The tread 6 as shown partially protects the shoulder of the rim 10 from injury due to striking any projecting object. It may of course cover and protect the rim entirely, or it may be shaped to a more uniform arc on the inside if desired.

Disposed in the space surrounded by the tire is an outwardly extending projection 11, this projection being rigid and preferably formed integral with the rim or rigidly secured thereto. It is preferably of diameter equal to or greater than that side of the rim that is of larger diameter than the other side. It may be solid as shown, or of thin sections to save weight, and may be of one or several assembled parts. It may be of cast, forged, or welded metal, or of composition material. This projection is shown as being between the seats 4 and 7, and between the seat 4 and the projection is an inwardly extending recess 12, the bottom of which is of a smaller diameter than that of the seat 4. Preferably both the projection and the recess are of annular form extending completely around the rim, as will be understood by those skilled in the art.

Figure 2:
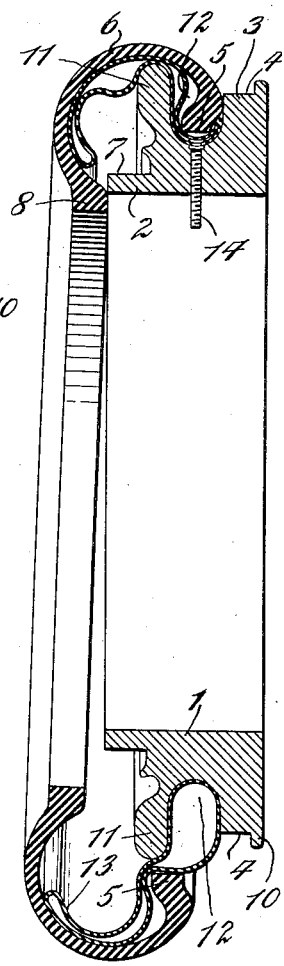
Fig. 2 is a view on the same plane as Fig. 1, but showing the relation of the rim to a tire while the tire is being put in place or removed.
Figure 3:
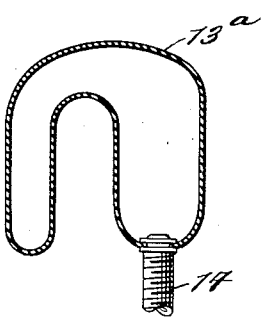
Fig. 3 is a view showing a preformed inner tube adapted for use with this invention.

Referring now to Fig. 2 in particular, it will be seen that the placing of the projection 11 within the tire will not prevent easy assemblage and removal, this being true because of the fact that the recess 12 is provided. The ring 9 may be removed as indicated in Fig. 2, and then the tire may be moved bodily to the left of Fig. 2 until the edge portion 5 passes into the recess 12. That will permit the edge portion 5 diametrically opposed to the part within the recess to be moved outwardly past the end of the projection 11 as shown at the bottom of Fig. 2. The tire may then be removed by bending it sufficiently to have it pass over the circular projection 11. Of course, in placing the tire on the rim, a reverse operation is employed.

The tire is provided with the usual inner tube 13 which may be inflated in the usual manner, as by a valve 14 passing through the rim and into the inner tube at the bottom of the recess 12. Of course, the valve may be placed in any other convenient location. It will be seen that the inner tube being flexible, as is well known in the art, will follow the contour of the inner wall of the tire and of the rim, and when deflation takes place, for any reason, the load is at once transferred to the projection 11, thereby preventing any serious reduction in the effective diameter of the wheel.

Figure 4:
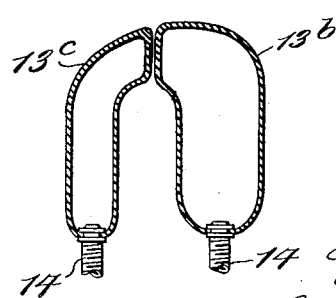
Fig. 4 is a view similar to Fig. 3 showing a different form of inner tube.

The inner tube may be preformed to fit the shape of the rim and its projection as shown at 13ª, or may be in two parts as shown at 13ᵇ and 13ᶜ, as may be most convenient. In case the forms shown in Fig. 4 are used, of course, suitable openings in the rim will be provided for the passage of the necessary number of valves 14.

While I have shown the invention as embodied in a certain form, it is, of course, to be understood that it may be embodied in other forms without departing from the scope of the invention and, therefore, I do not intend to limit myself except by the appended claims.

I claim:

1. A wheel provided with a rim having one side of substantially greater diameter than the other, a pneumatic tire mounted on said rim and having one edge seated on each of said sides, a rigid projection secured to said rim in fixed position and extending within the space surrounded by the tire and of a larger diameter than the large-diameter side of the rim, and an inner tube between said projection and tire.

2. A wheel provided with a rim having one side of greater diameter than the other, a pneumatic tire mounted on said rim and having one edge seated on each of said sides, a rigid projection on said rim extending within the space surrounded by the tire and of a larger diameter than the large-diameter side of the rim with a recess between the projection and said large-diameter side, and an inner tube between said projection and tire.

3. A wheel provided with a rim having one side of greater diameter than the other, a pneumatic tire mounted on said rim and having one edge seated on each of said sides, a rigid projection on said rim extending within the space surrounded by the tire and of a larger diameter than the large-diameter side of the rim with a recess between the projection and said large-diameter side, and an inner tube between said projection and tire, said inner tube being preformed to fit said projection and said recess.

4. A wheel provided with a rim having one side of greater diameter than the other, a pneumatic tire mounted on said rim and having one edge seated on each of said sides, a rigid projection on said rim extending within the space surrounded by the tire and of a larger diameter than the large-diameter side of the rim with a recess between the projection and said large-diameter side, and an inner tube between said projection and tire, said inner tube being made in two parts.

5. A wheel provided with a rim having a pneumatic tire mounted thereon, a rigid projection secured to said rim in fixed position and extending outwardly therefrom into the space bounded by said tire, whereby upon collapse of the tire the load normally carried by the tire will be transferred to the projection, and means to hold said tire in position on said rim, said rim, tire, and projection being so arranged relatively to each other that the tire may be removed from said rim in a direction generally parallel to the axis of said wheel.

6. A wheel provided with a rim having a pneumatic tire mounted thereon, a rigid projection on said rim extending outwardly therefrom into the space bounded by said tire, whereby upon collapse of the tire the load normally carried by the tire will be transferred to the projection, seats on the rim on opposite sides of the projection and on which the edges of the tire are carried, and an inwardly extending recess between the projection and one of said seats, the bottom of the recess having a diameter smaller than that of the said seat.

7. A wheel provided with a rim having one side of substantially greater diameter than the other, a pneumatic tire mounted on said rim, with each edge of the tire seated on one of said sides, one of said tire edges being located adjacent the tread of the tire, and a rigid projection secured to the rim in fixed position and extending outwardly therefrom into the space bounded by said tire.

8. A wheel provided with a rim having one side of substantially greater diameter than the other, a pneumatic tire mounted on said rim, with each edge of the tire seated on one of said sides, one of said tire edges being located adjacent the tread of the tire, and a rigid projection secured to the rim in fixed position and extending outwardly therefrom into the space bounded by said tire, the diameter of said projection being at least as great as that of the larger diameter side of the rim.

9. A pneumatic tire adapted to be mounted on a wheel rim and comprising a tread portion, bead portions adapted to contact with opposite sides of said rim, and a tire side wall connecting one of said bead portions to said tread portion, said other bead portion being connected substantially directly to said tread portion with substantially no side wall therebetween.

ELY M. T. RYDER.